Patented Oct. 9, 1923.

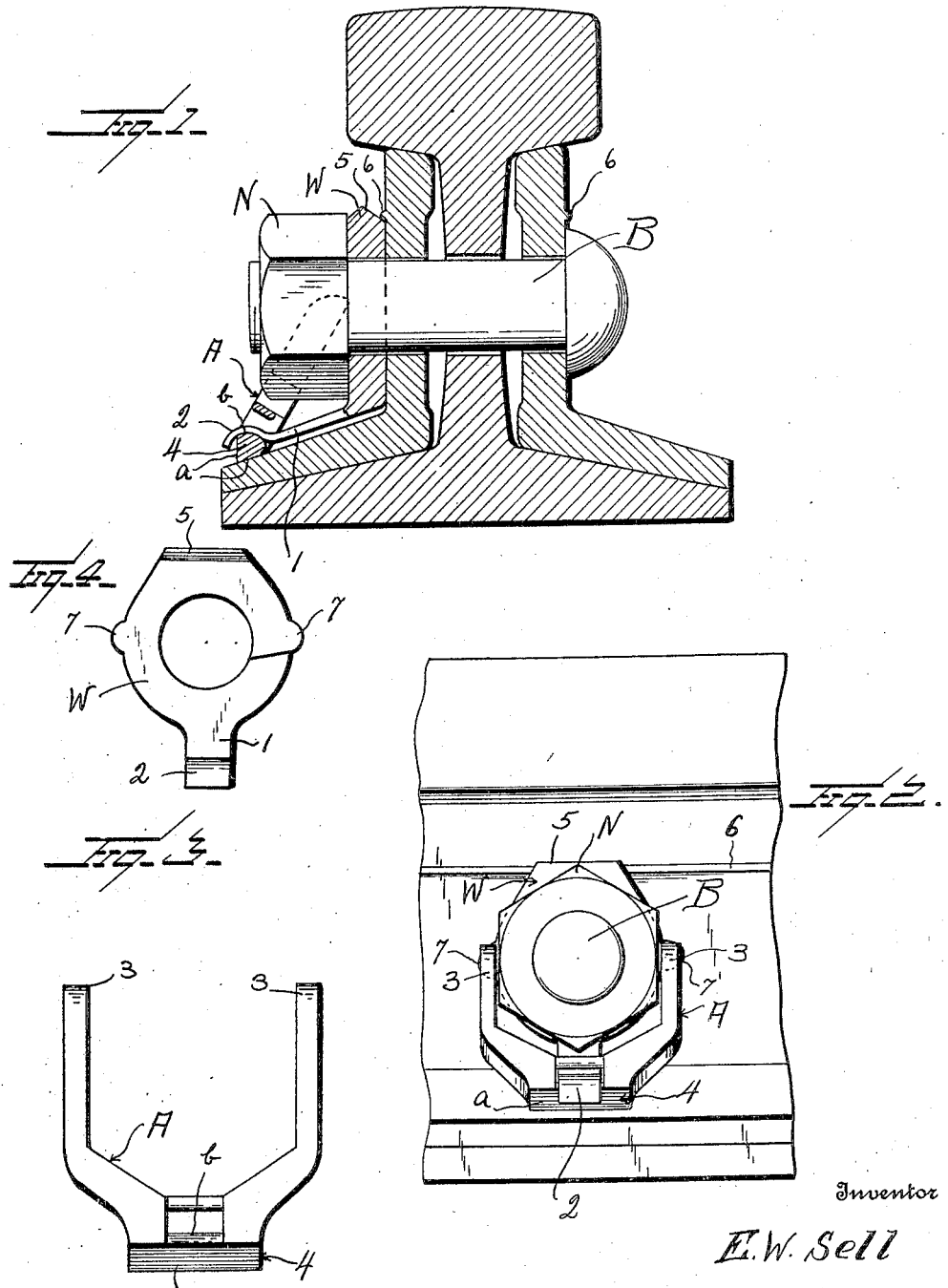

1,470,294

UNITED STATES PATENT OFFICE.

EMANUEL W. SELL, OF CLEVELAND, OHIO.

NUT LOCK.

Application filed October 15, 1921, Serial No. 507,943. Renewed March 14, 1923.

*To all whom it may concern:*

Be it known that I, EMANUEL W. SELL, a citizen of the United States, residing at Cleveland, in the county of Cuyahoga and State of Ohio, have invented certain new and useful Improvements in Nut Locks, of which the following is a specification, reference being had to the accompanying drawings.

This invention relates to certain improvements in nut locks, and it is an object of the invention to provide a novel and improved device of this general character which may be readily and effectively applied in working position and which may also be adjusted in order to permit removal of the nut, when desired.

Another object of the invention is to provide a novel and improved device of this general character embodying two relatively movable members, one of said members being adapted to be mounted upon the bolt and the second of said members being adapted to engage the coacting nut for holding said nut against rotation.

The invention consists in the details of construction and in the combination and arrangement of the several parts of my improved nut lock whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view partly in section and partly in elevation illustrating a nut lock constructed in accordance with an embodiment of my invention and in applied position;

Figure 2 is a view in front elevation illustrating my improved nut lock, the coacting work being indicated in fragment;

Figure 3 is a view in elevation of the nut engaging member detached; and

Figure 4 is an elevational view of the washer W.

As disclosed in the accompanying drawings, B denotes a bolt herein disclosed as disposed through the web of a rail and the fish plate associated therewith. Coacting with the bolt B is a nut N.

My improved nut lock comprises a washer W adapted to surround the bolt B inwardly of the applied nut N. Extending outwardly and laterally from the periphery of the washer W is a resilient or spring arm 1 terminating in a hook member 2 facing in a direction away from the nut N.

A denotes a substantially U-shaped member having its side arms 3 spaced apart a distance so as to substantially snugly receive therebetween the nut N so that, when the member A is in working position, said nut is effectively held against rotation and particularly in a retrograde direction.

The intermediate or central portion 4 of the member A is angular in cross section to provide the converging faces $a$ while the inner face $b$ of said portion 4 is arcuate in cross section.

In practice, the hook portion 2 of the arm 1 constantly bears down upon the curved or arcuate portion $b$ of the intermediate part 4 of the member A whereby the member A is effectively maintained in working position, as particularly illustrated in Figure 1, yet at the same time readily permits said member A to be swung outwardly and rearwardly to free the arms 3 from the nut N so that said nut, when desired, may be removed.

The relative angle of the faces $a$ of the portion 4 of the member A is dependent upon the character of the work with which the device is associated. When the member A is in a position to lock the nut N, the inner face $a$ is on such angle as to assure the arms 3 assuming proper position with respect to the nut N.

The peripheral portion of the washer W at a point substantially diametrically opposed to the arm 1 is straight, as at 5, said edge being oppositely chamfered or beveled to permit said edge to have effective contact with an outstanding rib or bead 6 carried by the adjacent face of the work, said rib or bead 6 serving to hold the washer W against rotation around the bolt B, thereby materially facilitating the functioning of my improved nut lock.

The washer W, which may be of a split type as indicated in Figure 4, is provided at diametrically opposed points with the outstanding shoulders 7 with which the arms 3, when in working position, are adapted to contact so that it is assured that said arms 3 will be maintained in the proper position to hold the nut N against rotation.

From the foregoing description it is thought to be obvious that a nut lock constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with a nut, a bolt and the work associated therewith; a nut lock comprising a washer engaging the bolt between the nut and the work, said washer being provided with a laterally disposed resilient arm terminating in a hook member facing the direction away from the nut, a substantially U-shaped member having its side arms spaced apart a distance to receive the nut therebetween the intermediate portion of the U-shaped member having a face arcuate in cross section with which the hook member of the arm engages from above, said U-shaped member resting upon the work.

2. In combination with a nut, a bolt and the work associated therewith; a nut lock comprising a washer engaging the bolt between the nut and the work, said washer being provided with a laterally disposed resilient arm terminating in a hook member facing the direction away from the nut, a substantially U-shaped member having its side arms spaced apart a distance to receive the nut therebetween the intermediate portion of the U-shaped member having a face arcuate in cross section with which the hook member of the arm engages from above, said U-shaped member resting upon the work, the intermediate portion of the U-shaped member also being angular in cross section to provide converging faces, one of said faces contacting with the work when the U-shaped member is in locking position with respect to the nut.

3. In combination with a nut, a bolt and the work associated therewith; a nut lock comprising a washer engaging the bolt between the nut and the work, said washer being provided with a laterally disposed resilient arm terminating in a hook member facing the direction away from the nut, a substantially U-shaped member having its side arms spaced apart a distance to receive the nut therebetween the intermediate portion of the U-shaped member having a face arcuate in cross section with which the hook member of the arm engages from above, said U-shaped member resting upon the work, said washer being provided with outstanding shoulders with which the arms of the U-shaped member are adapted to contact to maintain said arms in proper position with respect to the nut.

In testimony whereof I hereunto affix my signature.

EMANUEL W. SELL.